United States Patent [19]
Prillinger et al.

[11] Patent Number: 5,934,650
[45] Date of Patent: Aug. 10, 1999

[54] FLUID OPERATED JACK MOUNTING ARRANGEMENT

[75] Inventors: Peter F. Prillinger; Christopher J. Smith; David A. Young, all of Sunderland, United Kingdom

[73] Assignee: Caterpillar Inc., Peoria, Ill.

[21] Appl. No.: 08/916,034

[22] Filed: Aug. 21, 1997

[51] Int. Cl.$^6$ .................................................. B66F 3/24
[52] U.S. Cl. ........................................................ 254/93 R
[58] Field of Search ............................... 254/93 R, 93 H, 254/133 R

[56] References Cited

U.S. PATENT DOCUMENTS

| | | |
|---|---|---|
| 3,007,589 | 11/1961 | Galloway . |
| 3,087,626 | 4/1963 | Kimball ............................ 254/93 R |
| 3,349,931 | 10/1967 | Wagner . |
| 3,815,764 | 6/1974 | Gilfillan et al. . |
| 3,941,260 | 3/1976 | Fisher et al. . |
| 3,953,170 | 4/1976 | Webb . |
| 3,973,468 | 8/1976 | Russell, Jr. . |
| 4,037,821 | 7/1977 | Greene ............................... 254/93 R |
| 4,071,153 | 1/1978 | Booher . |
| 4,516,904 | 5/1985 | Simmons . |
| 4,954,040 | 9/1990 | Smith et al. . |
| 5,456,521 | 10/1995 | Moyna . |

FOREIGN PATENT DOCUMENTS

| | | |
|---|---|---|
| 0 012 227 | 6/1980 | European Pat. Off. . |
| 0 056 928 | 8/1982 | European Pat. Off. . |
| 0 220 936 | 6/1987 | European Pat. Off. . |
| 1476178 | 6/1967 | France . |

*Primary Examiner*—Robert C. Watson
*Attorney, Agent, or Firm*—Alan J. Hickman

[57] ABSTRACT

A first tubular member is rigidly connected to a load engaging implement and a second tubular member is disposed in and retained in the first tubular member. The second tubular member is connected to a fluid operated jack. The second tubular member is rotatable in the first tubular member and maintains a cylinder housing and rod of the fluid operated jack for relative rotation. A fastener pivotally connects the fluid operated jack to the second tubular housing and a fixed member mounted on a load supporting body.

20 Claims, 5 Drawing Sheets

FLUID OPERATED JACK MOUNTING ARRANGEMENT

TECHNICAL FIELD

This invention relates to a mounting arrangement for a fluid operated jack and more particularly to a mounting arrangement for connecting a fluid operated jack to a load engaging implement.

BACKGROUND ART

Fluid operated jacks have been utilized in applications for moving a load engaging implement, for example, an ejector of a load carrying machine, between spaced apart load carrying and load ejecting positions relative to a load carrying body of the machine. The fluid operated jack is often operatively connected to and between the load engaging implement and telescopically extensible to move the load engaging implement between the extended and retracted positions. It has been found that the amount of space required between the load engaging ejector and the load carrying body to house the jack substantially reduces the load carrying capacity of the load carrying body and makes such configuration unattractive.

Attempts have been made to alleviate this problem but have all resulted in an unsuitable solution. For example, in U.S. Pat. No. 3,815,764, to William C. Gilfillan et. al., dated Jun. 11, 1974, the jack is disposed in a protective tubular member mounted on the load engaging member and axially oriented in the direction of movement of the load engaging member. The protective tubular member extends to one side of the load ejecting. The jack is connected to the load engaging implement by way of a trunion mounting assembly on the other side of the load engaging member. This configuration helps to reduce the space required between the load carrying body and the load engaging implement. However, because the trunion mounting cantilevers the jack, the amount of clearance between the cylindrical housing of the jack and the protective tubular member is substantial. This is required to accommodate manufacturing and operating tolerances and prevent side loading of the jack during extension of the jack. As a result, the size of the tubular member and supporting structure is massive, takes space, and subsequently reduces the amount of load carrying capacity of the load carrying body.

The fluid operated jack of the Gilfillan et. al. Patent is held by the trunion mounting so that the cylinder housing carrying the other telescopic jack sections is restrained from rotation about the longitudinal jack axis. Since the longitudinal axis is maintained substantially horizontal, premature wear of the cylinder, seals, and other related components will occur on the low side of the components (beneath the longitudinal axis). This wear results in leakage of the fluid operated jack.

Other configurations have been tried to provide a jack for powering movement of a load engaging member which appear to attempt to solve the above discussed problems. For example, in U.S. Pat. No. 3,941,260, to Don H. Fisher et. al., dated Mar. 2, 1976, the fluid operated jack is at an angle (not horizontal) relative to the load engaging member. This configuration addresses some of the problems associated with having a horizontal fluid operated jack. However, this configuration reduces the load carrying capacity of the load carrying body, is not as efficient or effective in power transfer and smoothness of operation and requires a higher fluid pressure or a larger diameter jack to apply an adequate or equivalent force to the blade.

The invention is directed at overcoming one or more of the problems set forth above.

DISCLOSURE OF THE INVENTION

In one aspect of the present invention, a mounting arrangement for connecting a cylinder housing of a fluid operated jack to a reciprocally movable load engaging implement is provided. The jack has a rod pivotally connected to a fixed member and slidably telescopically movable relative to the cylinder housing. A first tubular member having a first end and a second end is connected to the implement. A first stop member is connected to the first end of the first tubular member. A second stop member is connected to the second end of the first tubular member. A second tubular member having first and second ends is disposed in the first tubular member. The second tubular member has a longitudinal axis and is free to rotate about the longitudinal axis in the first tubular member. A fastener connects the second tubular member to the cylinder housing. The cylinder housing is free to rotate with the second tubular member during movement of the cylinder relative to the rod between an extended position and a retracted position. The first end of the second tubular member is engaged with the first flange during movement of the cylinder housing toward the extended position and the second end of the second tubular member is engaged with the second flange during movement of the cylinder housing toward the retracted position.

In another aspect of the present invention, a mounting arrangement for connecting a fluid operated jack to a reciprocally movable load engaging implement and a fixed member is provided. The jack has a cylinder housing and a rod slidably telescopically movably connected to the cylinder housing. A first tubular member having a first end and a second end is connected to the implement. A first stop member is connected to the first end of the first tubular member. A second stop member is connected to the second end of the first tubular member. A second tubular member having a first end, a second end, a longitudinal axis is disposed in the first tubular member. The first and second ends are axially movable relative to the first and second stops a preselected clearance distance. The second tubular member is free to rotate about the longitudinal axis in the first tubular member. A first pin connects the second tubular member to a one of the cylinder housing and the cylinder rod. A second pin connects the fixed member to the other of the cylinder housing and the rod. One of the cylinder housing and rod is free to rotate with the second tubular member during relative movement of the cylinder housing and rod between an extended position and a retracted position. The first end of the second tubular member is engaged with the first flange during movement of the cylinder housing toward the extended position and the second end of the second tubular member is engaged with the second flange during movement of the cylinder housing toward the retracted position.

BEST MODE FOR CARRYING OUT THE INVENTION

Figure 1:
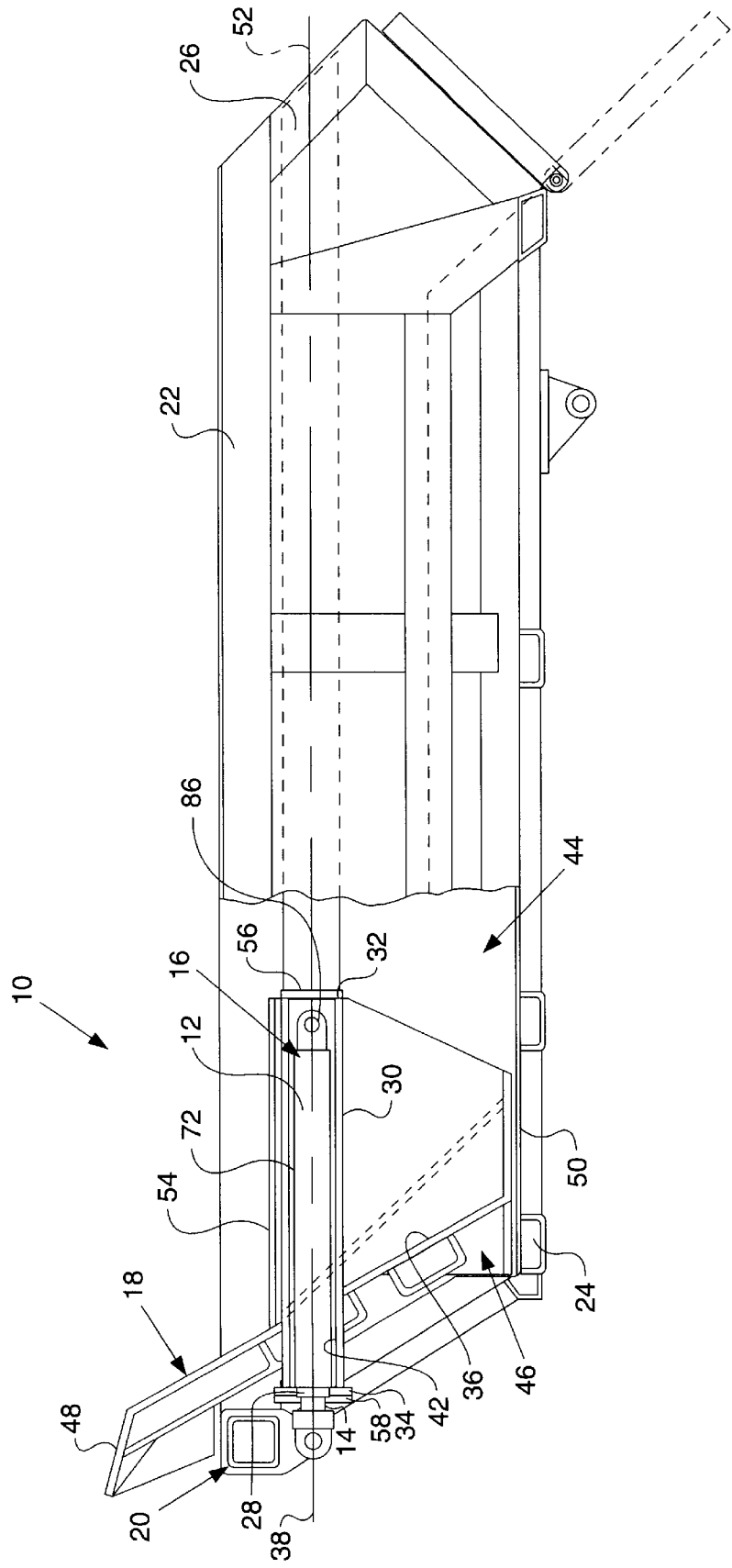
FIG. 1 is a diagrammatic longitudinal cross-sectional view of an embodiment of the present invention showing, a fluid operated jack at a retracted position, and a mounting arrangement for connecting a load engaging implement to a cylinder housing of the fluid operated jack and a rod of the fluid operated jack to a load carrying body.
Figure 2:
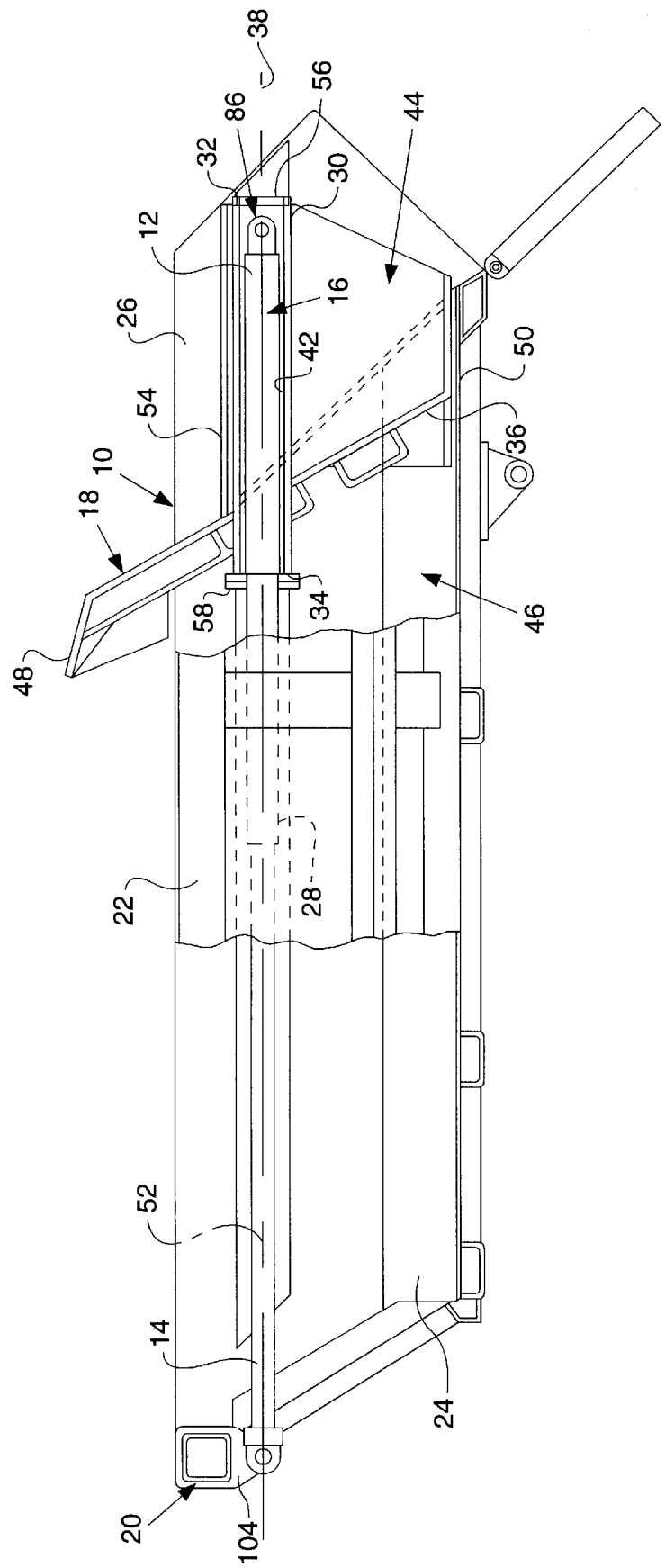
FIG. 2 is an diagrammatic longitudinal cross-sectional view similar to the embodiment shown in FIG. 1, but, with the fluid operated jack at an extended position.

With reference to the drawings and in particular FIGS. 1 and 2, a mounting arrangement 10 for connecting a cylinder housing 12 and a rod 14 of a fluid operated jack 16 to a reciprocally movable load engaging implement 18 and fixed member 20 of a load carrying body 22 is shown. The rod 14 is shown as being pivotally connected to the fixed member 20 of a load carrying body 22 and the cylinder housing 12 is shown as being pivotally connected to the load engaging implement 18. However, it is to be recognized that the connections may be reversed without departing from the spirit of the invention.

The rod 14 is slidably telescopically movable relative to the cylinder housing 12 between a retracted position (FIG. 1) at which the load engaging implement 18 is adjacent a second end portion 24 of the load carrying body 22 and an extended position (FIG. 2) at which the load engaging implement 18 is adjacent a first end portion 26 of the load carrying body 22. At the retracted position, the load carrying body 22 is capable of carrying a maximum payload. The load is ejected from the load carrying body 22 when at the extended position.

Figure 3:
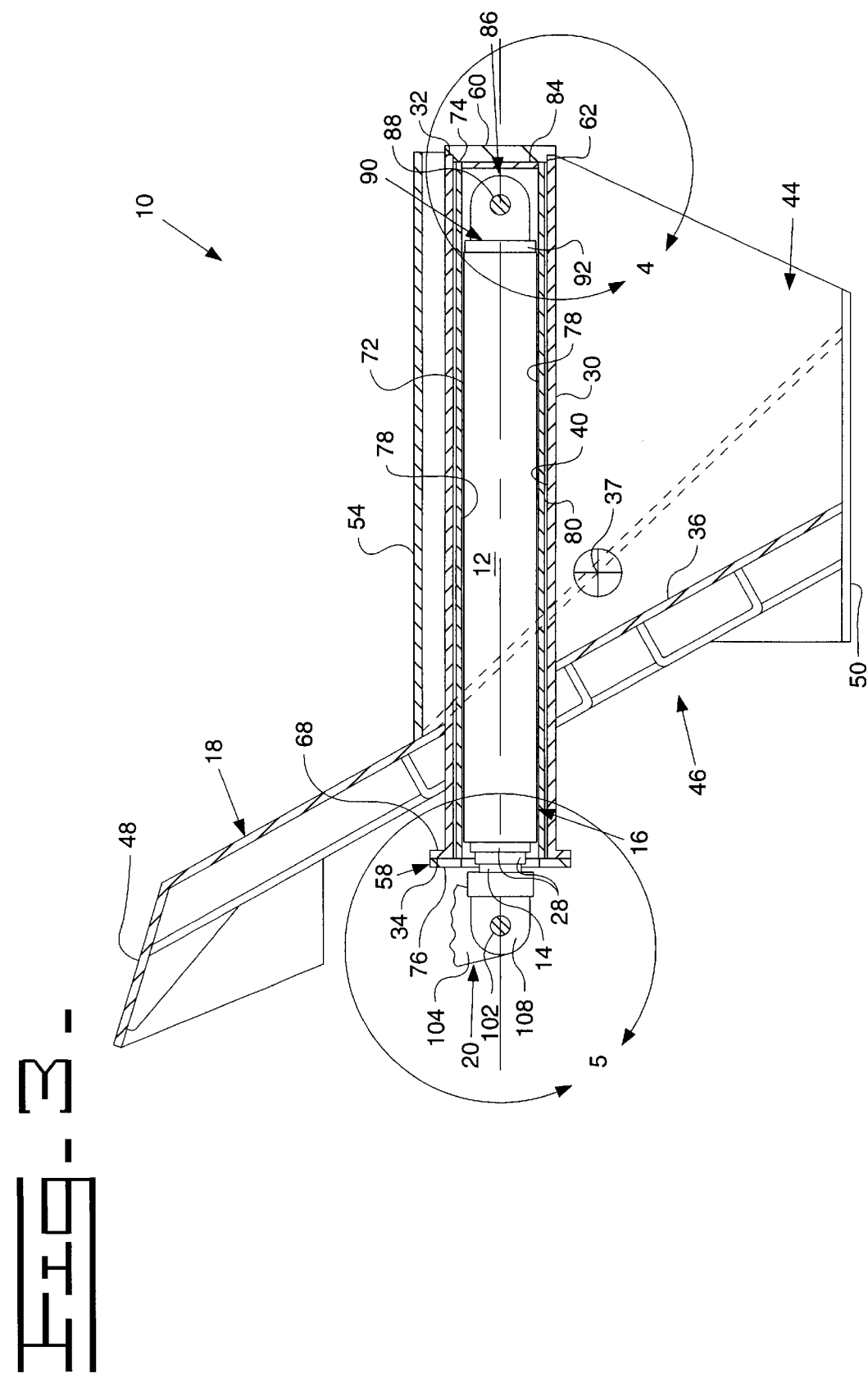
FIG. 3 is an enlarged diagrammatic longitudinal cross-sectional view of a portion of the embodiment of FIG. 1 showing the mounting arrangement in greater detail.

As best seen in FIG. 3, the fluid operated jack 16 is preferably a multistage fluid operated jack 16 and includes, in addition to the cylinder housing 12 and rod 14, at least one intermediate tubular rod 28 (two are shown) slidably axially movably disposed between the cylinder housing 12 and the rod 14. The fluid operated jack 16 is shown as being rod ported and passes pressurized fluid flow internally in order to reduce external fluid lines. Since fluid operated jacks 16 of this type are very well known in the art, no further discussion will be undertaken related to the construction thereof.

A first tubular member 30 has first and second spaced ends 32, 34 and is connected to a load engaging frame 36 of the implement 18 at a preselected elevational location between first and second elevationally spaced ends 48, 50 of the frame 36, The first tubular member 30 is also located at a preselected transverse location between first and second side portions (not shown) of the frame 36. The predetermined elevational and transverse locations are established based on a center of gravity 37 of the implement 18.

The first end 32 of the first tubular member 30 is located to a first side 44 of the frame 36 and the second end 34 of the first tubular member 30 is located to a second side 46 of the frame 36. The first tubular member 30 has a longitudinal central axis 38 and a bore 40. The first tubular member 30 is disposed in a bore 42 in the load engaging frame 36 and extends axially in a direction substantially parallel to an axis 52 of reciprocal movement of said load engaging implement 18 caused by extension and retraction of the fluid operated jack 16. In the embodiment shown the axis 38 is coincident with the axis 52.

The first tubular member 30 is preferably welded to the load engaging frame 36. To provide additional strength and stability to the connection, a stiffening member 54 is connected to frame and the first tubular member 30. The stiffening member 54 is preferably a "V" shaped channel and is connected to the frame 36 and the first tubular member 30 located on the first side 44 of the frame 36 by welding. The stiffening member 54 extends substantially the length of the first tubular 30 member located to the first side 44 of the load engaging frame 36.

Figure 4:
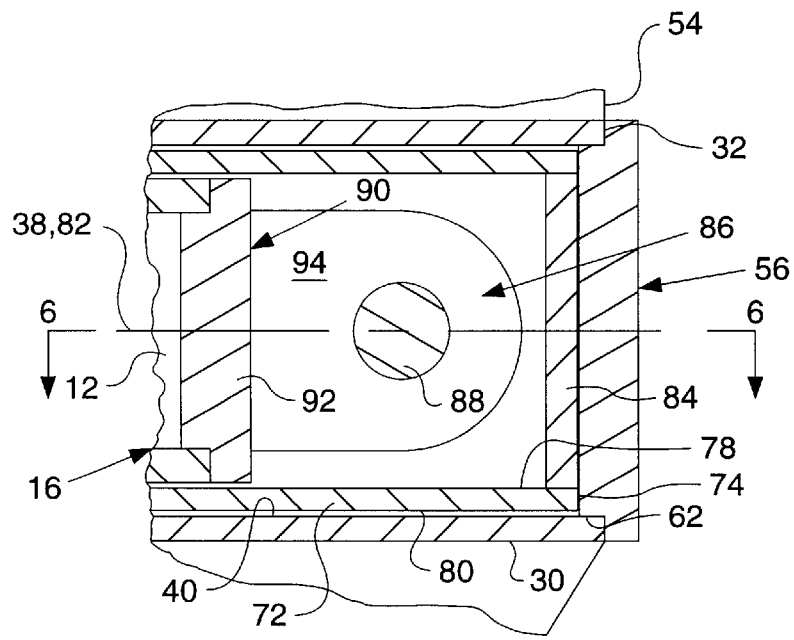
FIG. 4 is a diagrammatic enlarged detail view of a portion of the mounting arrangement of FIG. 3 located on a first side of the load engaging implement.

A first stop member 56 is connected to the first end 32 of the first tubular member 30 and a second stop member 58 is connected to the second end 34 of the first tubular member 30. The first stop member 56 seals the first end of the first tubular member 30 and prevents debris, dirt and other elements from entering the bore 40. As best seen in FIG. 4, the first stop member 56 is preferably a circular end cap 60 having a pilot portion 62 disposed in the bore 40 and welded to the first end 32 of the first tubular member 30.

Figure 5:
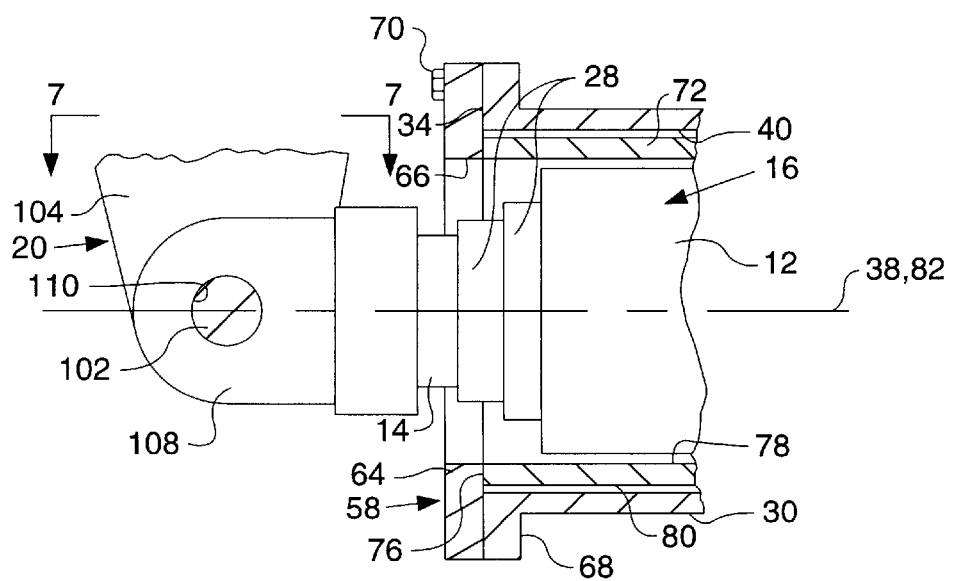
FIG. 5 is a diagrammatic enlarged detail of a portion of the mounting arrangement of FIG. 3 located on a second side of the load engaging implement.

As best seen in FIG. 5, the second stop member 58 includes a stop flange 64 having an aperture 66 disposed transversely therethrough. The stop flange 64 is connected to the second end 34 of the first tubular member 30. In particular, the stop flange 64 is removably connected to a connecting flange 68, located at the second end 34 of the first tubular member 30, by a plurality of threaded fasteners 70 (only one shown). The flange 64 extends radially inwardly relative to the axis 38 a predetermined radial distance beyond the bore 40 of the first tubular member 30 so as to provide a stop. The rod 14 and the tubular rod 28 extends through the aperture 66 in the flange 64. The rod 14 is pivotally connected to the fixed member 20 located on the second side 46 of the load engaging frame 36.

As shown in FIGS. 3, 4, and 5, a second tubular member 72 has first and second ends 74, 76 and inner and outer cylindrical surfaces 78, 80. The second tubular member 72 is disposed in the bore 40 of the first tubular member 30. The second tubular member 72 has a longitudinal axis 82 and is free to rotate about the longitudinal axis 82 within in the bore 42 of the first tubular member 30. The longitudinal axis 82 is shown as being coincident with the longitudinal central axis 38 of the first tubular cylinder 30. The diameter of the outer cylindrical surface 80 of the second tubular member 72 is smaller in magnitude than the diameter of the bore 40 of the first tubular member 30 a preselected amount. This facilitates rotary movement of the second tubular member 72 relative to the first tubular member 30. An end cap 84 is connected to the first end 74 of the second tubular member 74 by welding. The end cap 84 substantially seals the end and prevents debris, dirt and other foreign material from entering.

The first and second ends 74, 76 of the second tubular member 72 are axially movable relative to the first and second stop members 56, 58 a preselected clearance distance. The clearance distance is provided by virtue of the length of the second tubular member 72 being shorter than the length of the first tubular member 30. The clearance distance is provided to freely maintain the second tubular member 72 for rotation relative to said first tubular member 30. The combination of radial and axial clearances of the first and second tubular members 30,72 also allows for some misalignment caused by operation and manufacturing tolerances.

It is to be noted that the cylinder housing 12 may be directly movably disposed in the longitudinal bore 40 of the first tubular member 30 and free to rotate about the longitudinal axis of the fluid operated jack 16 relative to the first tubular member 30 during relative movement of the cylinder housing 12 and rod 14 between extended and retracted positions without departing from the spirit of the invention. In this embodiment, the cylinder housing 12 engages the first stop member 56 during movement of the cylinder housing 12 toward the extended position and engages the second stop member 58 during movement of the cylinder housing 12 toward the retracted position. The cylinder housing 12 is axially spaced a preselected distance from one of the first and second stop members 56,58 during engagement with the other of the first and second stops 56,58 in order to provide clearance and free up the cylinder housing 12 for wear reducing rotation and undesirable side loading.

Figure 6:
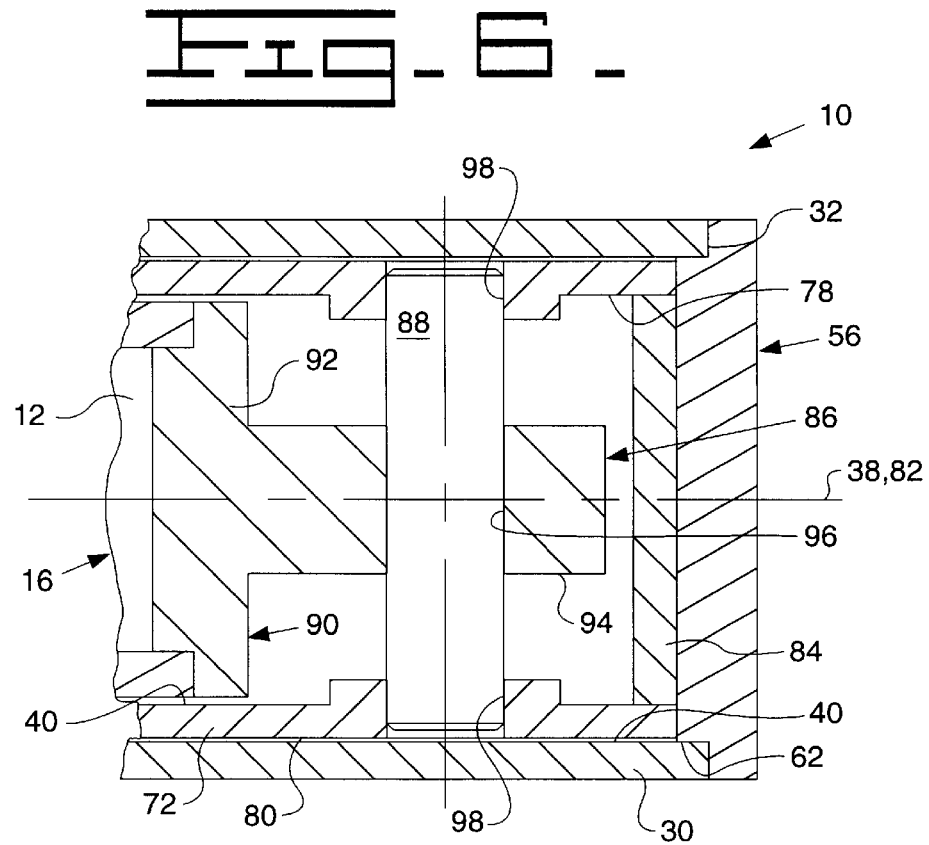
FIG. 6 is a cross-sectional view taken along lines 6—6 of FIG. 4.

As best seen in FIGS. 4 and 6, a fastener 86 is provided for connecting the second tubular member 72 to the cylinder housing 12 and maintaining the cylinder housing 12 to freely rotate with the second tubular member 72 during telescopic movement of the cylinder housing 12 relative to extend 14 between extended and retracted positions. The fastener 86 includes a first pin 88 which pivotally connects the second tubular member 72 to the cylinder housing 12. In particular, the cylinder housing 12 has a first housing end 90 and an end cap 92 connected, in any suitable manner, such as by welding, threading, a retainer wire, or other well known connecting techniques, to the first housing end 90. The first pin 88 pivotally connects the end cap 92 to the second tubular housing 72.

A flange 94 having an aperture 96 disposed therethrough is connected to the end cap 92. An aperture 98 is radially transversely disposed through the second tubular member 72 at a location thereon adjacent to the first end 74. The first pin 92 is disposed in the aperture 98 of the second tubular member 72 and in the aperture 96 of the flange 98 so as to pivotally connect the cylinder housing 12 to the second tubular member and provide pivotal movement of the fluid operated jack 12 thereabout. A sleeve bearing (not shown) may be provided in either aperture 96,98 to reduce wear and extend life. The first pin 88 may be retained in the apertures and from longitudinal pin movement in any suitable conventional manner, such as, by pressing, a snap ring, a pin and the like.

Figure 7:
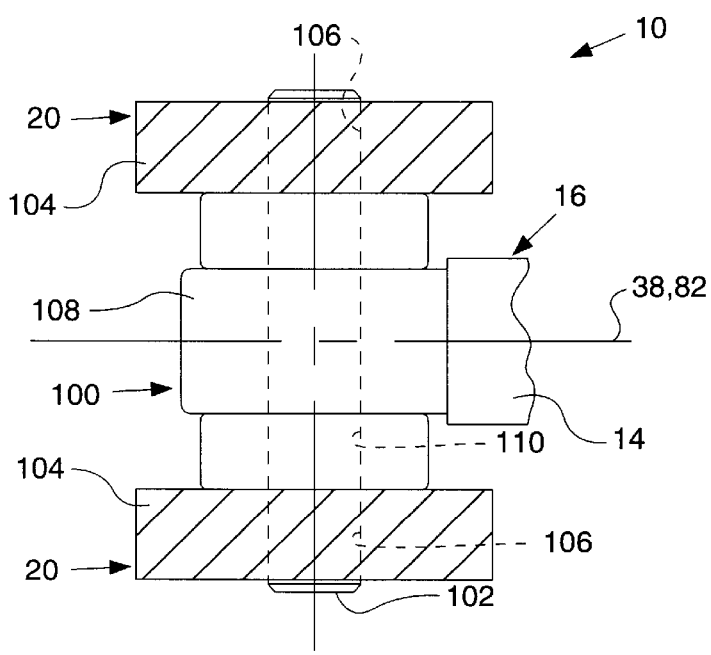
FIG. 7 is a cross-sectional view taken along lines 7—7 of FIG. 5.

As best seen in FIGS. 5 and 7, a fastener 100 is provided for connecting the rod 14 to the fixed member 20 mounted on the load carrying body 22. The fastener 100 includes a second pin 102 pivotally connecting the rod 14 to the fixed member 20. The fixed member 20 includes a bifurcated portion 104 located on the second side 46 of load engaging frame 36. The bifurcated portion 104 has an aperture 106 disposed transversely therethrough. A rod eye 108 having an aperture 110 is connected to the rod 14 at an end of the rod 14. The second pin 102 is disposed in the apertures 106,110 and pivotally connects the rod eye to the bifurcated portion 104. A sleeve bearing (not shown) may be provided in appropriate ones of the apertures 106,110 to reduce wear and extended life. The second pin 102 may be retained in the apertures 106,110 and from longitudinal pin movement in any suitable conventional manner, such as, by pressing, a snap ring, a pin and the like.

It should be recognized that the above described connections may be reversed. The first pin 88 may connect the second tubular member 72 to the cylinder rod 14 and the second pin 102 may connect the fixed member to the cylinder housing 12 without departing from the spirit of the invention. In this arrangement, the cylinder rod 14 is free to rotate with the second tubular member 72 during relative telescopic movement of the cylinder housing 12 and rod 14 between extended and retracted positions.

The first end 74 of the second tubular member 72 is engaged with the first stop member 56 during telescopic movement of the fluid operated jack 16 toward the extended position and said second end 76 of the second tubular member 72 being engaged with the second stop member 58 during telescopic movement of the fluid operated jack 16 toward the retracted position. This engagement facilitates movement of the load engaging implement 18 between the first and second end portions 24,26 of the load carrying body 22.

Industrial Applicability

With reference to the drawings, and in operation, the fluid operated jack 16 is effective to move the load engaging implement relative to the load carrying body 22 between a load ejected position adjacent the first end portion 26 of the load carrying body 22 (corresponds to the extended position of the jack 16) and a load carrying position adjacent the second end portion 24 of the load carrying body 22 (corresponds to the retracted position of the jack 16).

The mounting arrangement 10, which pivotally connects the fluid operated jack 16 to the load engaging implement 18 and the load carrying body 22, allows the cylinder housing 12 to rotate relative to the rod 14 and thereby facilitates smooth operation, reduced wear, and extended life of the fluid operated jack. Uneven wear to components of the fluid operated jack 16, such as, the rings, seals, rod and housing thereof is common in substantially horizontally oriented fluid operated jacks 16 that are not free to rotate. As the fluid operated jack 16 extends and retracts, rotation of the cylinder housing 12 is achieved by way of the second tubular member 72. Because the second tubular member is loosely disposed in the first tubular member 30 and between the first and second stop members 58,56, the natural inclination for relative rotation is maintained.

We claim:

1. A mounting arrangement for connecting a cylinder housing of a fluid operated jack to a reciprocally movable load engaging implement, said jack having a rod pivotally connected to a fixed member and slidably telescopically movable relative to the cylinder housing, comprising:

a first tubular member having a first end and a second end and being connected to the implement;

a first stop member connected to the first end of the first tubular member;

a second stop member connected to the second end of the first tubular member;

a second tubular member having first and second ends and being disposed in the first tubular member, said second tubular member having a longitudinal axis and being free to rotate about the longitudinal axis in the first tubular member;

a fastener connecting the second tubular member to the cylinder housing, said cylinder housing being free to rotate with said second tubular member during movement of said cylinder relative to said rod between an extended position and a retracted position, said first end of the second tubular member being engaged with said first stop member during movement of said cylinder housing toward the extended position and said second end of the second tubular member being engaged with the second stop member during movement of the cylinder housing toward the retracted position.

2. The mounting arrangement, as set forth in claim 1, wherein said cylinder housing having a first housing end and an end cap connected to the first housing end, said fastener including a pin pivotally connecting the end cap to the second tubular housing.

3. The mounting arrangement, as set forth in claim 2, including:

an aperture radially disposed in the second tubular member; and a flange having an aperture and being connected to the end cap, said pin being disposed in the aperture of the second tubular member and the flange.

4. The mounting arrangement, as set forth in claim 1, wherein the first and second ends of the second tubular member being axially movable relative to the first and second stops a preselected clearance distance, said clearance distance maintaining said tubular member to freely rotate relative to said first tubular member.

5. The mounting arrangement, as set forth in claim 4, wherein said first stop seals the first end of the first tubular member.

6. The mounting arrangement, as set forth in claim 5, where the first stop being an end cap welded to the first end of the first tubular member.

7. The mounting arrangement, as set forth in claim 4, wherein said second stop includes a stop flange having an aperture disposed therethrough and being connected to the second end of the first tubular member, said rod extending through the aperture in the flange.

8. The mounting arrangement, as set forth in claim 7, including:

a mounting flange connected to the second end of the first tubular member; and fastening means for removably connecting the stop flange to the mounting flange.

9. The mounting arrangement, as set forth in claim 7, wherein said jack being a multistage jack having an intermediate tubular rod slidably axially movably disposed between the cylinder housing and the rod, said intermediate tubular rod extending through said aperture in the second stop flange.

10. The mounting arrangement, as set forth in claim 1, wherein said load engaging implement includes a frame, said first tubular member being connected to the frame and said first end of the first tubular member being located to a first side of the frame and said second end of the first tubular member being located to a second side of the frame.

11. The mounting arrangement, as set forth in claim 10, wherein said fixed member being located on the second side of the frame and said rod being pivotally connected to the fixed member on said second side of the frame.

12. The mounting arrangement, as set forth in claim 11, wherein said fixed member includes a bifurcated portion located on the second side of load engaging frame and including a rod eye connected to the rod, said rod eye being located between and pivotally connected to the bifurcated portion by a pivot pin.

13. The mounting arrangement, as set forth in claim 10, wherein said frame having first and second elevationally spaced ends and said first tubular member being at a preselected elevational location between the first and second frame ends.

14. The mounting arrangement, as set forth in claim 13, wherein said first tubular member being substantially axially parallel to an axis of reciprocal movement of said load engaging implement.

15. The mounting arrangement, as set forth in claim 10 including a stiffening member connected to said frame and said first tubular member.

16. The mounting arrangement, as set forth in claim 15, wherein said stiffening member being a "V" shaped channel and connected to the frame and the first tubular member on the first side of the frame by welding.

17. The mounting arrangement, as set forth in claim 16, wherein the stiffening member extends substantially a length of the first tubular member located to the first side of the frame.

18. The mounting arrangement, as set forth in claim 11, wherein said cylinder housing having a first housing end and being pivotally connected at the first housing end to the second tubular housing at a location adjacent the first end of the second tubular housing.

19. A mounting arrangement for connecting a fluid operated jack to a reciprocally movable load engaging implement and a fixed member, said jack having a cylinder housing and a rod slidably telescopically movably connected to the cylinder housing, comprising:

a first tubular member having a first end and a second end and being connected to the implement;

a first stop member connected to the first end of the first tubular member;

a second stop member connected to the second end of the first tubular member;

a second tubular member having a first end, a second end, a longitudinal axis and being disposed in the first tubular member, said first and second ends being axially movable relative to the first and second stop members a preselected clearance distance, said second tubular member being free to rotate about the longitudinal axis in the first tubular member;

a first pin connecting the second tubular member to a one of the cylinder housing and the cylinder rod;

a second pin connecting the fixed member to the other of the cylinder housing and the rod, said one of the cylinder housing and rod being free to rotate with said second tubular member during relative movement of said cylinder housing and rod between an extended position and a retracted position, said first end of the second tubular member being engaged with said first stop member during movement of said cylinder housing toward the extended position and said second end of the second tubular member being engaged with the second stop member during movement of the cylinder housing toward the retracted position.

20. A mounting arrangement for connecting a fluid operated jack to a reciprocally movable load engaging implement and a fixed member, said jack having a cylinder housing, a rod slidably telescopically movably connected to the cylinder housing, and a bore, comprising:

a first tubular member having a first end, a second end spaced from the first end, and a longitudinal bore, said first tubular member being connected to the implement;

a first stop member connected to the first end of the first tubular member;

a second stop member connected to the second end of the first tubular member;

said cylinder housing being movably disposed in the longitudinal bore of the first tubular member and being free to rotate about the longitudinal jack axis;

a pin connecting the fixed member to the rod, said cylinder housing being free to rotate relative to the first tubular member during relative movement of said cylinder housing and rod between an extended position and a retracted position, said cylinder engaging said first stop member during movement of said cylinder housing toward the extended position and engaging the second stop member during movement of the cylinder housing toward the retracted position, said cylinder housing being axially spaced a preselected distance from a one of the first and second stops during engagement with an other of the first and second stops.

* * * * *